United States Patent
Akiyama et al.

[11] Patent Number: 6,068,354
[45] Date of Patent: May 30, 2000

[54] NON VIBRATION TREAD ANGLE FOR RUBBER TRACK

[75] Inventors: Hitoshi Akiyama; Matthew J. Beatty, both of West Des Moines; Louis F. Agocs, Jr., Des Moines, all of Iowa

[73] Assignee: Bridgestone/Firestone, Inc., Akron, Ohio

[21] Appl. No.: 09/092,131

[22] Filed: Jun. 5, 1998

[51] Int. Cl.⁷ .................................................. B62D 55/096
[52] U.S. Cl. ................... 305/160; 305/178; 152/209 NS
[58] Field of Search ................................. 305/157, 160, 305/165, 174, 178, 191; 152/209 N, 209 NS, 209 RR, 209 LG

[56] References Cited

U.S. PATENT DOCUMENTS

| | | | |
|---|---|---|---|
| 1,487,340 | 3/1924 | Kroupsky | 305/184 |
| 1,627,287 | 5/1927 | Kegresse | 305/184 |
| 2,476,828 | 7/1949 | Skromme | 305/170 |
| 3,619,012 | 11/1971 | Bizier et al. | 305/168 |
| 3,637,266 | 1/1972 | Busse | 305/158 |
| 3,857,617 | 12/1974 | Grawley | 305/180 |
| 4,481,993 | 11/1984 | Ohnishi | 152/209 B |
| 4,777,993 | 10/1988 | Yamashita et al. | 152/209 R |
| 5,005,921 | 4/1991 | Edwards et al. | 305/170 |
| 5,005,922 | 4/1991 | Edwards et al. | 305/184 |
| 5,178,698 | 1/1993 | Shibata | 152/209 R |
| 5,362,142 | 11/1994 | Katoh | 305/172 |
| 5,380,076 | 1/1995 | Hori | 305/171 |

FOREIGN PATENT DOCUMENTS

| | | | |
|---|---|---|---|
| 355072469 | 5/1980 | Japan | 305/165 |
| 903241 | 2/1982 | U.S.S.R. | 305/165 |

*Primary Examiner*—D. Glenn Dayoan
*Assistant Examiner*—Paul Chenevert
*Attorney, Agent, or Firm*—Michael Sand; John M. Vasuta

[57] ABSTRACT

A track (10) for a vehicle is typically carried by a plurality of wheels (12, 14, 16). Tread-wheel vibration is created when the track (10) passes between a wheel and the ground over which the vehicle is traveling. A track (10) includes a plurality of external lugs (32) that engage the ground when the track (10) is in use. Each external lug (32) has a tread angle (a) indicating the angle at which the lug is disposed to the longitudinal axis (34) of the track (10), a tread pitch (P) and a lug width (H). A wheel (16) contacting the interior of the track (10) has a width (B). A tread design that minimizes tread-wheel vibration has the pitch (P) of the lugs (32) substantially equal to the wheel width (B) multiplied by the tangent of the tread angle (a).

19 Claims, 5 Drawing Sheets

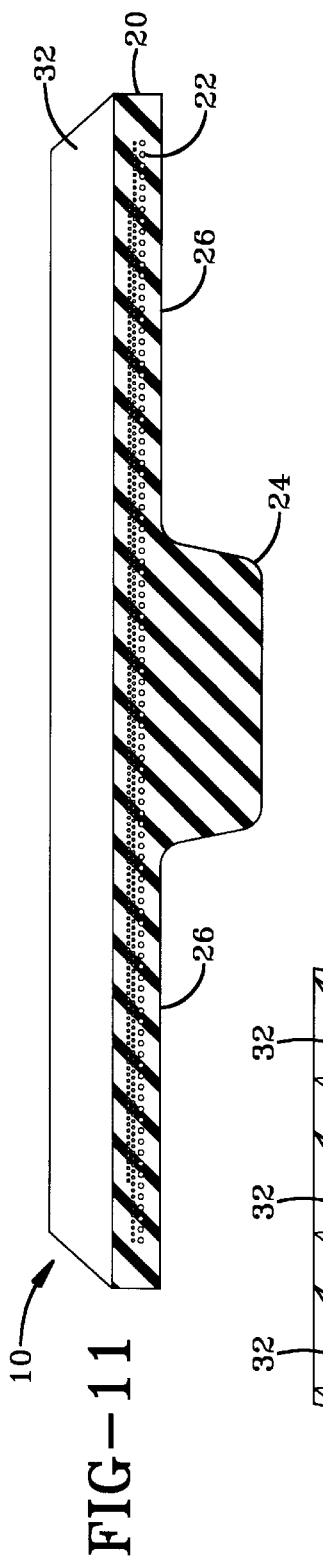
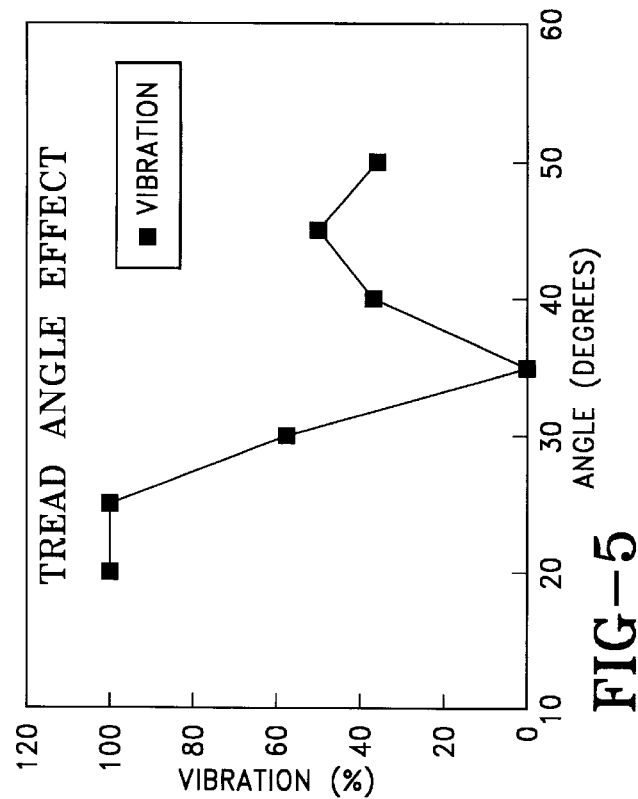

NON VIBRATION TREAD ANGLE FOR RUBBER TRACK

BACKGROUND OF THE INVENTION

1. Field of Invention

The present invention relates generally to endless tracks for off-highway vehicles and, more particularly, to a track configuration that minimizes treadwheel vibration. Specifically, the present invention relates to the relationship between the tread angle and wheel width in an endless track that minimize tread-wheel vibration in the wheels about which the track is disposed.

2. Background of the Invention

An endless track is often fabricated from an elastomeric material reinforced with calendared plies of steel belts or the like. The outside surface of the endless track typically is provided with a plurality of spaced lugs that are designed to grip rough, broken, or soft ground and provide traction to the vehicle employing the track. The inner surface of the track typically has a pair of relatively smooth runners spaced from each other by a centrally-disposed lug section that is engaged by a drive wheel to drive a track about the supporting drive wheel assembly. The supporting drive wheel assembly may also have a plurality of bogey wheels and idlers that ride in the smooth runner sections on either side of the lug section. These wheels help maintain alignment of the track about the supporting drive wheel assembly.

Tracked vehicles are typically designed to be operated on rough surfaces, that produce significant vibrations in the vehicle and a generally rough ride. Although surface-related vibrations are expected on rough surfaces, tread-wheel vibration occurs on both rough surfaces and on relatively smooth surfaces. Tread-wheel vibration is caused by the wheels of the vehicle experiencing alternating stiffnesses while traveling over the endless track. The alternating stiffnesses are created by the spaced, exterior lugs of the track. As described above, the lugs are disposed on the outside surface of the track while the wheels engage a relatively smooth inner surface. When a wheel is directly over a lug the track stiffness is relatively firm but is somewhat less stiff when the wheel is over a space between lugs. The stiffnesses create vibrations in the wheels and thus the vehicle.

Thus, it may be understood that tread-wheel vibration would essentially decrease to zero if the lugs were spaced so close together that the wheels did not experience the changes in stiffness. Such a design would not, however, provide sufficient traction.

Tread-wheel vibration is detrimental to the longevity of the wheel bearings, axles, etc. and increases the frequency of maintenance required on the tracked vehicle. Tread-wheel vibration also decreases the comfort of the vehicle's ride. It is thus desirable to provide a track for a vehicle that minimizes tread-wheel vibration. It is thus desirable to provide a vibration-minimizing tread pattern that also provides traction to the vehicle.

SUMMARY OF THE INVENTION

In view of the foregoing, it is an object of the present invention to provide an endless track for a vehicle having a lug pattern and wheel width arrangement that cooperate to minimize tread-wheel vibration in the endless track.

Another object of the present invention is to provide an endless track arrangement wherein the width of the wheels is related to the tread angle of the lugs in order to reduce tread-wheel vibration in the endless track.

A further object of the present invention is to provide a method for designing a tread pattern for an endless track that minimizes tread-wheel vibration.

Another object of the present invention is to provide an endless track arrangement having a tread pattern that provides improved traction to the vehicle on which the track is disposed.

These and other objects and advantages of the invention are obtained by an improved endless elastomeric track, the general nature of which may be stated as including a combination of an endless elastomeric drive track and a plurality of wheels wherein each of the wheels has a width (B); the track including an endless belt and a tread having a plurality of spaced lugs; the endless belt having a longitudinal axis; each of the lugs having a tread angle (a) with respect to the belt and a tread pitch (P); wherein the tread pitch (P), the tread angle (a), and the wheel width (B) are related by a tread-wheel non-vibration formula of P=B*tan(a).

Other objectives of the present invention are obtained by a method of designing an endless track for a vehicle having minimized tread-wheel vibration wherein the vehicle has at least one wheel that engages the interior of the track, the track having a tread pitch (P) and a tread angle (a), the method including the steps of determining any two of the tread pitch (P), tread angle (a), or wheel width (B) for the endless track; and determining the remaining of the tread pitch (P), tread angle (a), or wheel width (B) from the formula P=B*tan(a).

Still other objectives of the present invention are obtained by an endless elastomeric drive track being disposed about a plurality of wheels, the drive track including a main body portion having a longitudinal axis, an inner surface, and a substantially planer outer surface; a plurality of longitudinally-spaced external lugs projecting outwardly from the outer surface of the main body; each of the lugs having first and second portions, the first and second portions spaced from each other across the longitudinal axis and being substantial mirror images of each other about the longitudinal axis; each of the portions having a first leg and a second leg; the first leg being substantially perpendicularly disposed with respect to the longitudinal axis; and the second leg extending rearwardly from the first leg at a tread angle.

BRIEF DESCRIPTION OF THE DRAWINGS

The preferred embodiments of the invention, illustrated of the best mode in which applicant in which Applicant has contemplated applying the principles, are set forth in the following description and are shown in the drawings and are particularly and distinctly pointed out and set forth in the appended claims.

FIG. 5 is a graph depicting the relation between vibration and tread angle with the wheel width held at constant at 218 mm.

FIG. 11 is an enlarged sectional view taken along Line 11—11 of FIG. 9.

FIG. 12 is a bottom plan view of a portion of the improved split chevron tread pattern.

Similar numbers refer to similar parts throughout the drawings.

DESCRIPTION OF PREFERRED EMBODIMENTS

Figure 8:
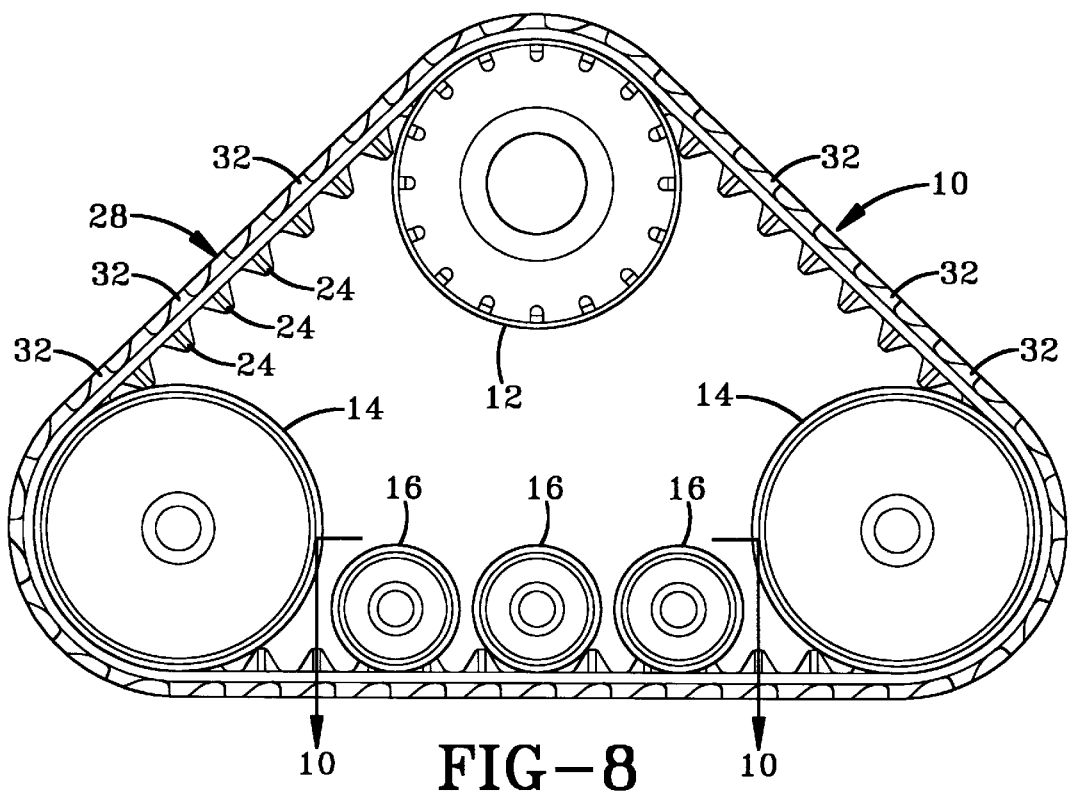
FIG. 8 is a front elevation view of an endless track disposed about a plurality of drive wheels, idler wheels, and bogey wheels.

The endless track made in accordance with the present invention is indicated generally by the numeral 10 in the accompanying drawings. Track 10 is depicted schematically in FIG. 8 as being disposed about a plurality of drive wheels that may be used to drive a typical off-highway vehicle. The drive wheels may contain a powered drive wheel 12, a plurality of idlerwheels 14, and a plurality of bogey wheels 16. As it may be seen in FIG. 11, track 10 includes a main body 20 that carries a plurality of reinforcing plies that may be calendared plies of metallic wires or cables 22. Track 10 also includes a series of inner lugs 24 that are configured to engage drive wheel 12 so that drive wheel 12 may drive track 10 about wheels 12, 14, and 16. Inner lugs 24 are centrally disposed and longitudinally aligned. Substantially planar, endless longitudinal areas are disposed on either side of inner lugs and are indicated by the numeral 26. The track tread 28 is disposed on the exterior of track 10 and includes a plurality of external lugs 32.

Figure 2:
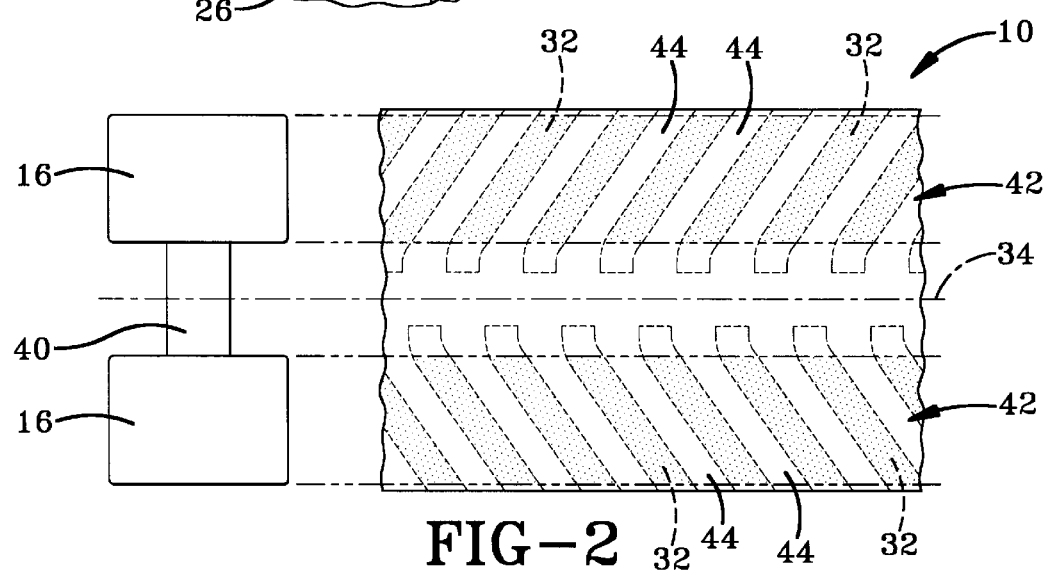
FIG. 2 is a top plan view of a portion of track according to the present invention depicting an alternating tread pattern.
Figure 3:
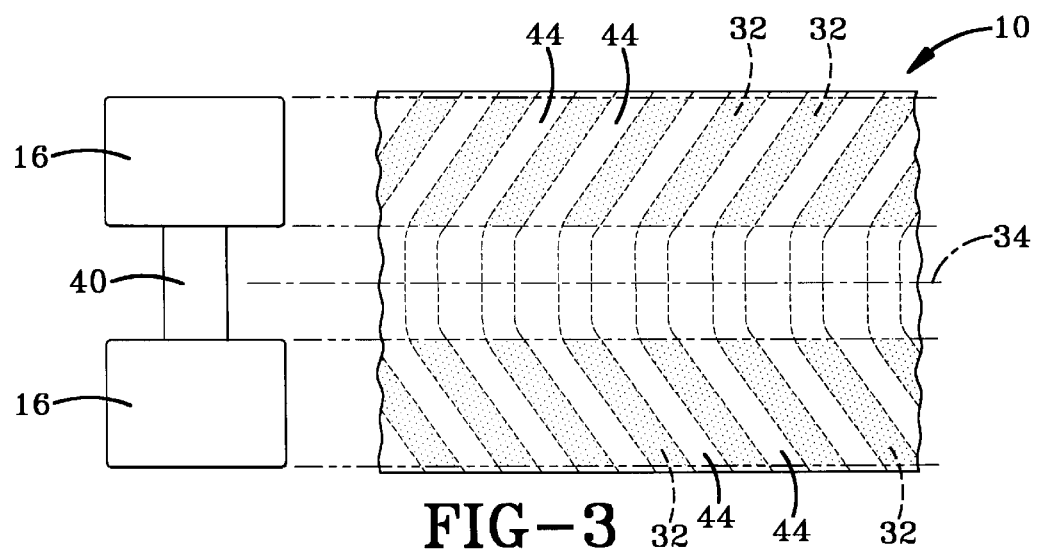
FIG. 3 is a top plan view of another portion of track according to of the present invention depicting a full chevron tread pattern.
Figure 9:
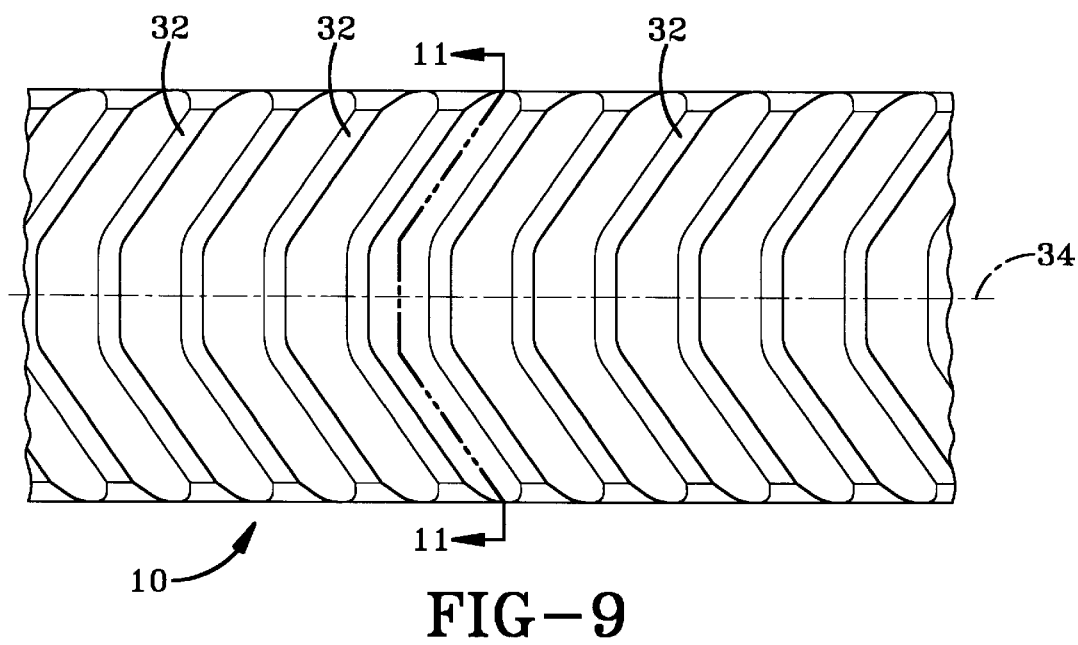
FIG. 9 is a bottom plan view of the full chevron tread pattern.

External lugs 32 may be configured in a variety of patterns that provide traction to the vehicle on which track 10 is used. An alternating tread pattern is depicted in FIG. 2. In this pattern, external lugs arranged 32 are in an altering or staggered configuration along each side of the central longitudinal axis 34 of track 10. A full chevron pattern is depicted in FIGS. 3 and 9. External lugs 32 are continuous in the full chevron pattern and are substantial mirror images of themselves along central longitudinal axis 34.

Another embodiment of the present invention is depicted in FIG. 12 and includes external lugs 32 disposed in an improved split chevron pattern. In this pattern, the main body 20 includes a substantially planar outer surface 31 from which external lugs 32 protrude outwardly. External lugs 32 in the split chevron pattern are spaced along longitudinal axis 34 such that each leg of lugs 32 is parallel to the corresponding leg of the other lugs 32. Each lug 32 in the improved split chevron pattern includes a first portion, indicated generally by the numeral 33, and a second portion, indicated generally by the numeral 35.

First portion 33 is spaced from second portion 35 across longitudinal axis 34 by a gap 36 such that no portion of first portion 33 contacts second portion 35. First portion 33 is also a substantial mirror image of second portion 35 over longitudinal axis 34. Each portion 33 and 35 includes a first leg 37 and a second leg 38 that extends angularly from the outer end of first leg 37. First leg 37 is disposed substantially perpendicular to longitudinal axis 34 while second leg 38 extends from first leg 37 at the tread angle 'a' described more fully below.

The improved split chevron external lug 32 pattern provides improved tractive effort in various soil conditions as compared to the tread configuration depicted in FIG. 2. The improved split chevron configuration of FIG. 12 builds upon the improved traction of the chevron configuration depicted in FIGS. 3 and 9 but further decreases the area of the external lugs 32 which, in turn, decreases the floatation capabilities of track 10. This allows track 10 to dig deeper in the soil thereby increasing the tractive effort.

Figure 1:
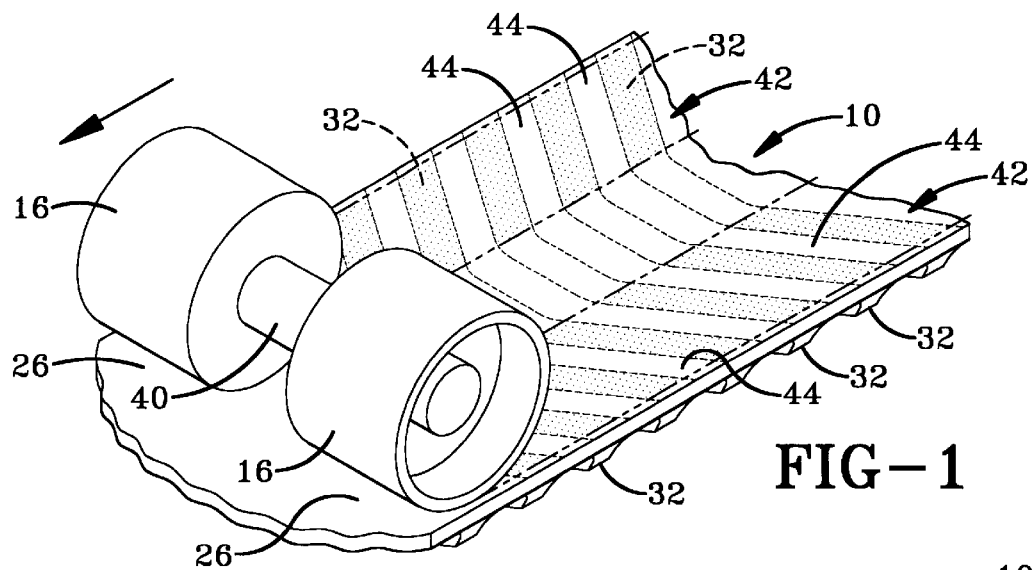
FIG. 1 is a perspective view of a pair of bogey wheels engaging a flat portion of lugged track with the interior lugs removed; the stippled areas representing the locations of the exterior lugs.

As may be seen in FIG. 1, bogey wheels 16 are connected by an axle 40 such that bogey wheels 16 operate in pairs. Bogey wheels 16 and axle 40 are configured such that axle 40 does not engage inner lugs 24 as track 10 passes under wheels 16. Tread-wheel vibration occurs in bogey wheels 16 as they rotate against endless wheel contact areas 42 of planar areas 26. The undesirable tread-wheel vibration is created from the change in stiffness experienced by bogey wheels 16 as they pass from areas directly over external lugs 32 to the areas between external lugs 32. When a bogey wheel 16 is directly over an external lug 32, it is said to be in contact with external lug 32. When bogey wheel 16 is in contact with an external lug 32, the stiffness of track 10 felt by bogey wheel 16 is higher than the stiffness felt by bogey wheel 16 when it is in contact with an area 44 between external lugs 32. Thus, it may be understood that as track 10 continuously passes under bogey wheel 16, the stiffness experienced by bogey wheel 16 constantly alters to create the tread-wheel vibration.

In accordance with one of the main objects of the present invention, tread 28 is configured to substantially reduce tread-wheel vibration. Tread 28 is configured to minimize tread-wheel vibration by interrelating the tread angle, indicated generally by the letter 'a', the tread pitch, indicated generally by the letter 'P', and the width of a bogey wheel, indicated generally by the letter 'B' (see FIG. 4).

Figure 4:
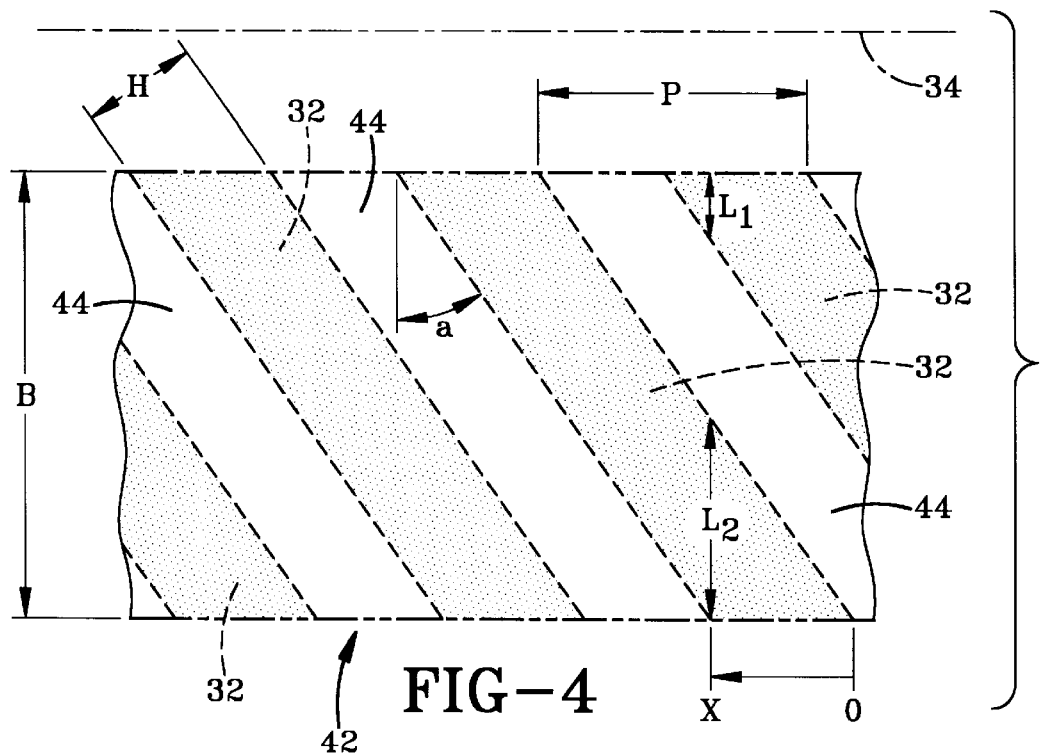
FIG. 4 is a top plan view of the portion of track that is engaged by one of the bogey wheels.
Figure 10:
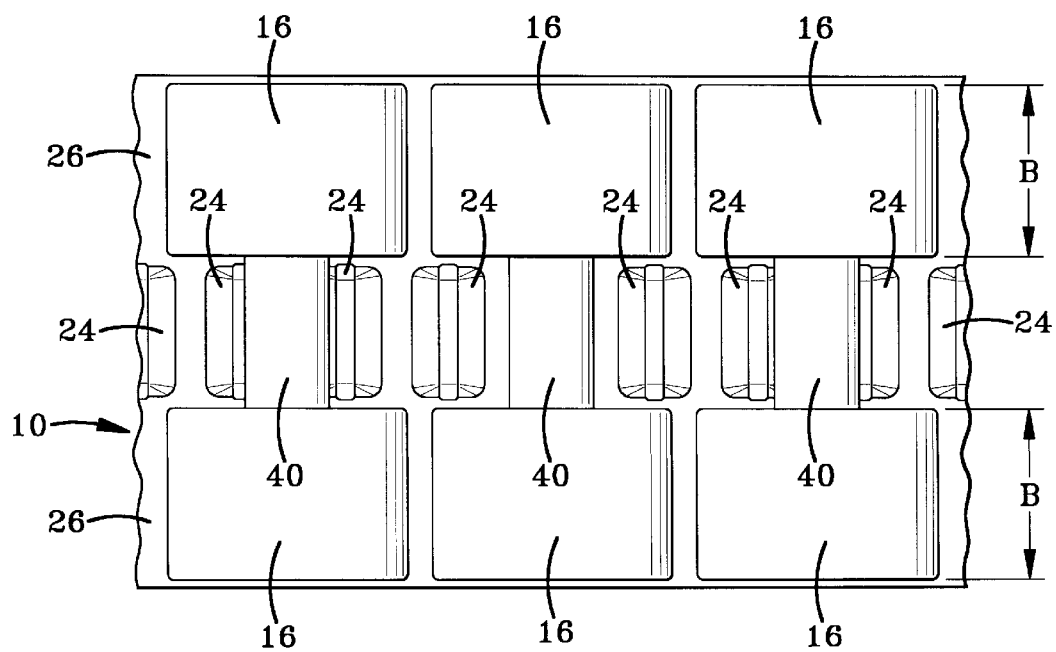
FIG. 10 is a fragmented plan view looking in the direction of Line 10—10 of FIG. 8.

FIG. 4 depicts a section of one of endless wheel contact areas 42 which a single bogey wheel 16 contacts during operation of the vehicle on which track 10 is disposed. The stippled areas indicate the location of external lugs 32 on the opposite side of track 10. As such, the stiffness felt by bogey wheel 16 is higher when bogey wheel 16 contacts a stippled area. Each lug 32 is disposed at an angle 'b' with respect to longitudinal axis 34 of track 10. The tread angle 'a' is thus determined by subtracting this angle 'b' from 90 degrees. Each external lug 32 has a pitch P which represents the distance between external lugs 32. Wheel contact area 42 has a width substantially equal to width B of bogey wheel 16. The width of each external lug 32 is indicated by the letter H.

With further reference to FIG. 4, it may be understood that it may be assumed that bogey wheel 16 is in tangential contact with the stippled areas that represent the locations of external lugs 32. The tangential contact is referred to as a wheel contact length which is indicated generally by the letter L. In the embodiment of the invention depicted in FIG. 4, wheel contact length L is the sum of the contact length over two adjacent lugs 32 as indicated by the sum of $L_1$ added to $L_2$. One way of measuring the tread-wheel vibration is to measure the change in wheel contact length L as wheel 16 moves relative to wheel contact area 42. As dimension 'X', representing the tangential location of wheel 16, changes, wheel contact length L changes. In accordance with another object of the present invention, a tread 28 configuration is provided wherein wheel contact length L does not vary or minimally varies as wheel 16 moves through a complete pitch P of an external lug 32. The variation in stiffness is significantly reduced when wheel contact length L is held constant throughout an entire pitch P of lugs 32.

The effect of holding wheel width B constant while varying tread angle 'a' may be seen graphically in FIG. 5. The X axis of FIG. 5 represents tread angle 'a' while the Y axis represents the measurement of vibration. The measurement of vibration is found from the following formula: (Lmax−Lmin)/(Lmax*100). It may thus be seen that vibration is substantially 100% until tread angle 'a' reaches about 25°. As tread angle 'a' further increases, vibration significantly drops until reaching about zero where tread angle 'a' equals about 35°. Vibration then increases until tread angle 'a' is about 45° and then decreases once again. It may thus be understood that it is desirable to use a tread angle of about 35° with a wheel width of 218 mm and a pitch of about 152 mm.

Figure 6:
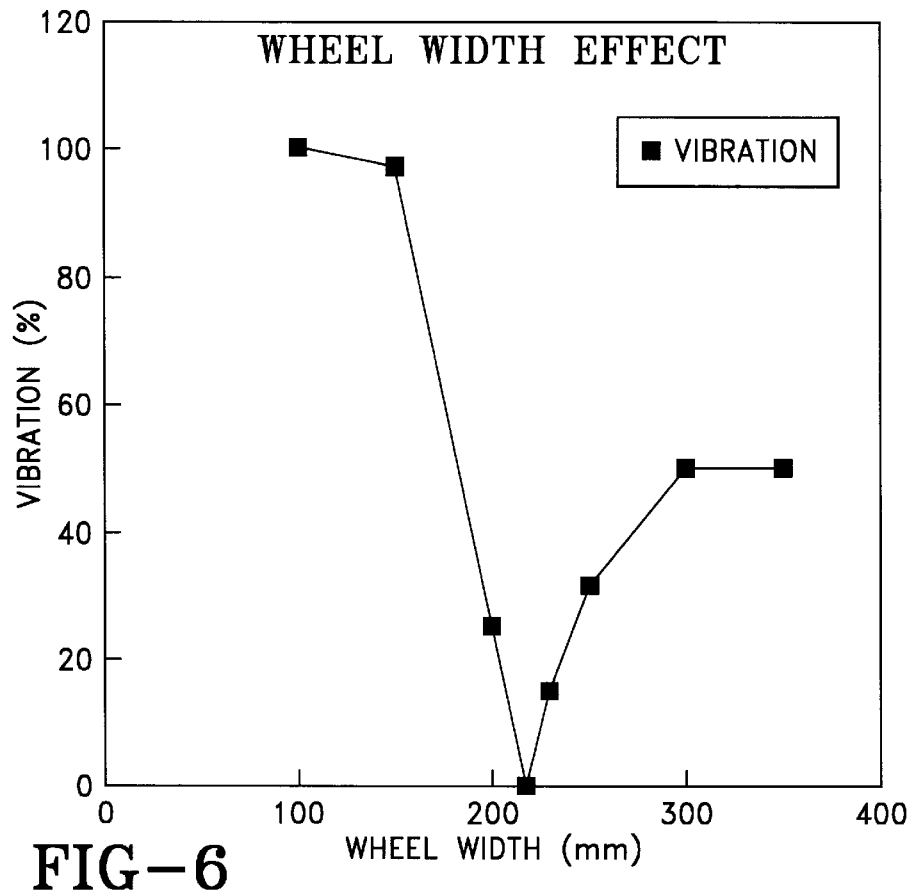
FIG. 6 is a graph depicting the relation between vibration and wheel width with the tread angle held constant at 35°.

FIG. 6 depicts the relationship of vibration with respect to wheel width B with the tread angle 'a' fixed at 35°, It can be seen that vibration significantly drops when wheel width B is greater than about 160 mm until reaching 0 when wheel width B is about 218 mm. Vibration then increases until flattening out after wheel width is greater than about 300 mm.

Figure 7:
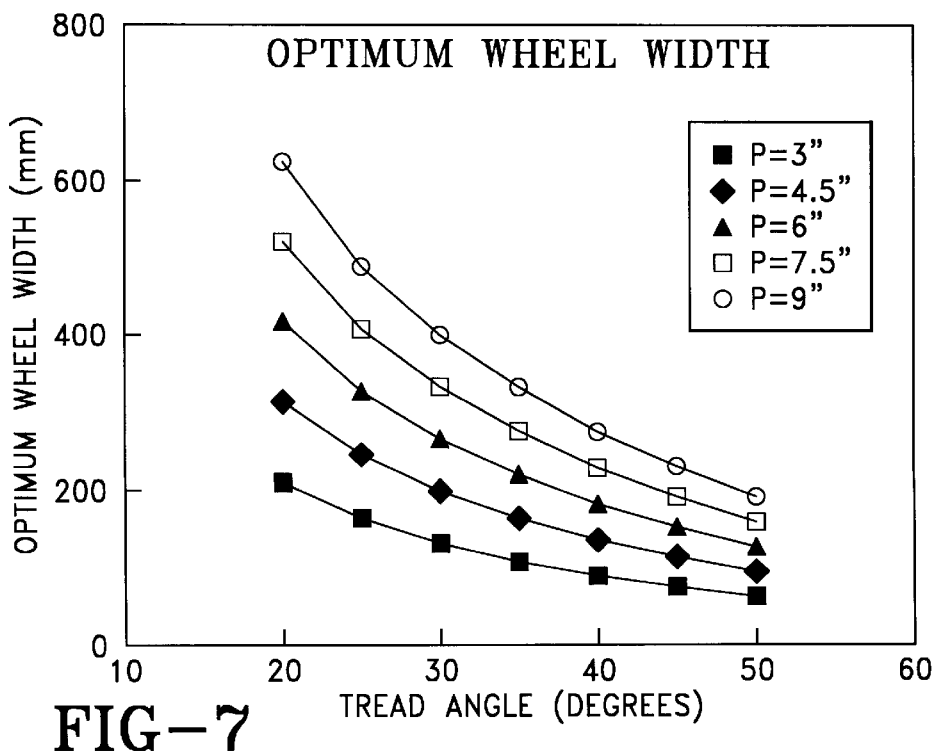
FIG. 7 is a graph depicting the relationship between wheel width and tread angle at different tread pitches.

FIG. 7 discloses the relationship between optimal wheel width B and tread angle 'a' at various pitches P. Each of the lines depicted on the graph represents the optimal parameters for minimizing tread-wheel vibration in tread 10. For instance, the information depicted in FIGS. 5 and 6 shows that the pitch about 6" when the tread angle 'a' is about 35° resulting in the optimal wheel width B to be about 218 mm. Such a graph is useful for designing external tread 32 configurations for specific wheel widths B. Specifically, it is easier to design a change in wheel width B than to change tread angle 'a' because a new tooling or mold is required changing tread angle 'a'.

From the foregoing information, it may be understood that it is desirable to minimize the fluctuation in wheel contact length L such that the Lmax dimension and Lmin dimension are close together, if not the same. To provide a tread 28 that minimizes such fluctuation, the following formula has been developed: P=Btan(a). This formula relates the spacing of lugs 32 to the wheel width B and tread angle 'a'. This formula thus allows a person designing a tread 28 for a specific application to minimize tread-wheel vibration. In one situation, the wheel width B may be fixed while the pitch P and tread angle 'a' may be varied. The designer then selects a desired pitch P or angle 'a' and calculates the remaining dimension from this formula. The resulting dimensions yield a tread 28 combined with wheel 16 that has minimal tread-wheel vibration. If the resulting dimension is impractical from the manufacturing or use standpoint, the designer may re-adjust one of the dimensions and try again. If a perfect result using the formula cannot be achieved, the designer then alters one of the variables in accordance with the information shown on the graphs in FIGS. 5, 6, and 7 to obtain a practical tread 28 with minimal vibration. The designer may then increase the lug width H in order to further reduce vibration. However, as described above, it is generally desired to keep the tread angle 'a' fixed to the angle 'a' of an existing mold. As such, the wheel width B is the dimension that is varied to provide a tread 28 with minimal vibration.

Accordingly, the improved tread-wheel design apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tread design is construed and used, the characteristics of the construction, and the advantages, new and useful results obtained; the new and useful structures, devices, elements, arrangements, parts and combinations, are set forth in the appended claims.

I claim:

1. In combination, an endless elastomeric drive track and a plurality of wheels wherein each of said wheels has a width (B); said track including an endless belt and a tread having a plurality of spaced external lugs; said endless belt having a longitudinal axis; each of said lugs having a tread angle (a) with respect to said belt and a tread pitch (P); wherein said tread pitch (P), said tread angle (a), and said tread wheel width (B) are related by a tread-wheel non-vibration formula of P=B*tan(a).

2. The combination of claim 1 wherein said plurality of spaced lugs are disposed in a full chevron pattern.

3. The combination of claim 1 wherein each of said plurality of spaced lugs includes first and second portions spaced from each other across said longitudinal axis.

4. The combination of claim 3 wherein each of said portions includes a first leg and a second leg; said first leg disposed substantially perpendicular to said longitudinal axis; and said second leg disposed at said tread angle.

5. The combination of claim 1 wherein said tread has a maximum contact length (Lmax) and a minimum contact length (Lmin) when engaging one of said plurality of wheels; an indicia of vibration being defined as (Lmax−Lmin)/(Lmax*100); said indicia of vibration being minimized when said lug pitch (P), tread angle (a), and wheel width (B) are defined by said tread-wheel vibration formula.

6. The combination of claim 5 wherein said tread angle is about 35 degrees when the wheel width is about 218 mm.

7. An endless elastomeric drive track being disposed about a plurality of wheels, said drive track comprising:

an endless belt having an outer surface and an inner surface;

said endless belt having a longitudinal axis;

said endless belt having at least one endless wheel contact area substantially parallel to said longitudinal axis; said endless wheel contact area having a longitudinal axis substantially parallel to said longitudinal axis of said endless belt; said endless wheel contact area having a lateral axis substantially perpendicular to said longitudinal axis of said endless wheel contact area;

said wheel contact area having a width (B) substantially equal to the width of one of said plurality of wheels;

a plurality of spaced lugs extending from said outer surface of said endless belt;

each of said lugs disposed at a tread angle (a) with respect to said lateral axis of said endless wheel contact area;

each of said lugs having a tread pitch (P);

said wheel contact area having a maximum contact length and a minimum contact length with respect to the lugs when engaging one of the plurality of wheels; and said contact length being substantially constant along said tread pitch.

8. An endless elastomeric drive track according to claim 7 wherein each of said plurality of spaced lugs includes first and second portions spaced from each other across said longitudinal axis.

9. An endless elastomeric drive track according to claim 8 wherein each of said portions includes a first leg and a second leg; said first leg disposed substantially perpendicular to said longitudinal axis; and said second leg disposed at said tread angle.

10. An endless elastomeric drive track according to claim 7, wherein said plurality of lugs are disposed in a full chevron pattern.

11. An endless elastomeric drive track according to claim 7, wherein said tread pitch (P), said tread angle (a), and said wheel contact area width (B) are related by a tread-wheel vibration formula of P=B*tan(a).

12. An endless elastomeric drive track according to claim 11 wherein said tread angle is about 35 degrees when the wheel contact area width is about 218 mm.

13. A method of designing an endless track for a vehicle having minimized tread-wheel vibration wherein the vehicle has at least one wheel that engages the interior of the track, the track having a tread pitch (P) and a tread angle (a), the method comprising the steps of:

determining any two of the tread pitch (P), tread angle (a), or wheel width (B) for the endless track; and determining the remaining of the tread pitch (P), tread angle (a), or wheel width (B) from the formula P=B*tan(a).

14. A method according to claim 13 further comprising the step of adjusting a tread width (H) for traction.

15. A method according to claim 13 further comprising the step of increasing a tread width (H) to further decrease vibration.

16. A method according to claim 13 wherein the step of determining any two of includes setting the tread angle at about 35 degrees.

17. An endless elastomeric drive track being disposed about a plurality of wheels, said drive track comprising:

a main body portion having a longitudinal axis, an inner surface, and a substantially planar outer surface;

a plurality of longitudinally-spaced external lugs projecting outwardly from said outer surface of said main body;

each of said lugs having first and second portions, said first and second portions spaced from each other across said longitudinal axis and being substantial mirror images of each other about said longitudinal axis;

each of said portions having a first leg and a second leg; said first leg of said first portion being spaced from said first leg of said second portion by a gap;

said first leg being substantially perpendicularly disposed with respect to said longitudinal axis;

said second leg extending rearwardly from said first leg at a tread angle (a); and wherein said inner surface of said main body has a pair of wheel contact areas aligned with said second legs; each of said wheel contact areas having a width (B); each of said second legs having a tread pitch (P) in said wheel contact area; wherein said tread pitch (P), said tread angle (a), and said wheel contact area width (B) are related by a tread-wheel non-vibration formula of P=B*tan(a).

18. An endless elastomeric drive track according to claim 17, wherein said tread angle is in the range of from about 30 degrees to about 40 degrees.

19. An endless elastomeric drive track according to claim 18 wherein said tread angle is about 35 degrees.

* * * * *